(12) United States Patent
Wheals

(10) Patent No.: US 9,556,901 B2
(45) Date of Patent: Jan. 31, 2017

(54) BEARING FOR WIND TURBINE

(75) Inventor: Jonathan Charles Wheals, Warwickshire (GB)

(73) Assignee: Ricardo UK Ltd., West Sussex (GB)

( * ) Notice: Subject to any disclaimer, the term of this patent is extended or adjusted under 35 U.S.C. 154(b) by 148 days.

(21) Appl. No.: 13/496,104

(22) PCT Filed: Sep. 14, 2010

(86) PCT No.: PCT/GB2010/001733
§ 371 (c)(1),
(2), (4) Date: May 30, 2012

(87) PCT Pub. No.: WO2011/033256
PCT Pub. Date: Mar. 24, 2011

(65) Prior Publication Data
US 2012/0237152 A1 Sep. 20, 2012

(30) Foreign Application Priority Data
Sep. 15, 2009 (GB) .................. 0916189.4

(51) Int. Cl.
F16C 19/52 (2006.01)
F16C 35/07 (2006.01)
F16C 25/06 (2006.01)
F16C 35/078 (2006.01)
F16C 35/073 (2006.01)
F16C 41/00 (2006.01)

(52) U.S. Cl.
CPC ............. F16C 25/06 (2013.01); F16C 19/52 (2013.01); F16C 35/073 (2013.01); F16C 35/078 (2013.01); F16C 41/001 (2013.01); F16C 2300/14 (2013.01); F16C 2360/31 (2013.01)

(58) Field of Classification Search
CPC ......... F16C 19/52; F16C 19/522; F16C 25/06; F16C 25/08; F16C 25/083; F16C 35/07; F16C 35/073; F16C 35/078; F16C 2360/31; F16C 2300/14; F01D 25/36; F03D 1/001; F05B 2230/60; Y02E 10/721; Y02E 10/728
USPC .................. 384/428, 559–564, 540, 548, 538
See application file for complete search history.

(56) References Cited

U.S. PATENT DOCUMENTS

| 434,480 | A |   | 8/1890 | Simonds |
|---|---|---|---|---|
| 724,834 | A | * | 4/1903 | Farr .............................. 384/500 |
| 958,963 | A | * | 5/1910 | Lockwood .................... 384/494 |
| 998,785 | A | * | 7/1911 | Lockwood .................... 384/571 |
| 1,057,861 | A | * | 4/1913 | Lockwood .................... 384/571 |

(Continued)

FOREIGN PATENT DOCUMENTS

| CA | 965360 A1 | 4/1975 |
|---|---|---|
| DE | 38 39 624 A1 | 5/1990 |

(Continued)

OTHER PUBLICATIONS

Machine Translation of EP 1167754.*

(Continued)

*Primary Examiner* — Alan B Waits
(74) *Attorney, Agent, or Firm* — Alston & Bird LLP

(57) ABSTRACT

A bearing assembly (12) for a rotating element (13) has one race (15) adapted to be fixed relative to ground (11) and to selectively be free for arcuate movement relative to ground. A selective locking device (18) can be provided for the relatively fixed/movable race (15).

14 Claims, 7 Drawing Sheets

(56) References Cited

U.S. PATENT DOCUMENTS

| | | | |
|---|---|---|---|
| 1,259,751 A * | 3/1918 | Kuhn | 384/583 |
| 3,141,384 A * | 7/1964 | Hoffman | 91/53 |
| 3,193,028 A * | 7/1965 | Radzimovsky | 175/372 |
| 3,791,231 A * | 2/1974 | Geary | 74/142 |
| 3,806,215 A | 4/1974 | Price et al. | |
| 4,090,409 A * | 5/1978 | Ohleyer | 74/128 |
| 4,273,391 A * | 6/1981 | Asberg | 384/494 |
| 4,341,426 A * | 7/1982 | Clapp | 384/487 |
| 5,560,687 A * | 10/1996 | Hagelthorn | 301/105.1 |
| 5,897,214 A | 4/1999 | Nisley | |
| 6,257,078 B1 * | 7/2001 | Vencill | 73/865.9 |
| 7,393,141 B2 * | 7/2008 | Fahrni et al. | 384/583 |
| 7,397,145 B2 * | 7/2008 | Struve et al. | 290/55 |
| 7,721,434 B2 * | 5/2010 | Weaver et al. | 29/889.2 |
| 7,788,786 B2 * | 9/2010 | Hewitt et al. | 29/525.11 |
| 7,794,153 B2 * | 9/2010 | Szczepanski et al. | 384/583 |
| 7,866,894 B2 * | 1/2011 | Hewitt | 384/556 |
| 7,958,797 B2 * | 6/2011 | Aust et al. | 74/99 R |
| 8,028,604 B2 * | 10/2011 | Moore et al. | 74/665 F |
| 8,120,198 B2 * | 2/2012 | Pabst et al. | 290/55 |
| 8,151,465 B2 * | 4/2012 | Hewitt | 29/898.07 |
| 8,210,810 B2 * | 7/2012 | Egoshi et al. | 416/1 |
| 8,310,080 B2 * | 11/2012 | Ramanujam | 290/55 |
| 8,341,840 B2 * | 1/2013 | Kawano et al. | 29/889.1 |
| 8,459,872 B2 * | 6/2013 | Nies et al. | 384/126 |
| 8,545,106 B2 * | 10/2013 | Miller et al. | 384/474 |
| 8,628,301 B2 * | 1/2014 | Pasquet | 416/155 |
| 8,696,314 B2 * | 4/2014 | Mashue et al. | 416/170 R |
| 2005/0058520 A1 | 3/2005 | Ricker | |
| 2005/0113204 A1 | 5/2005 | Wenstrup et al. | |
| 2006/0171623 A1 * | 8/2006 | Brandenstein et al. | 384/538 |
| 2007/0219039 A1 | 9/2007 | Fahrni et al. | |
| 2008/0075402 A1 * | 3/2008 | Hewitt | 384/538 |
| 2009/0148093 A1 * | 6/2009 | Fahrni et al. | 384/585 |
| 2010/0019502 A1 * | 1/2010 | Pabst et al. | 290/55 |
| 2011/0103731 A1 * | 5/2011 | Fahrni et al. | 384/572 |
| 2012/0137481 A1 * | 6/2012 | Lindberg et al. | 29/23.51 |
| 2013/0074335 A1 * | 3/2013 | Amano | 29/889 |
| 2013/0167679 A1 * | 7/2013 | Bastier | 74/411.5 |
| 2014/0224048 A1 * | 8/2014 | Munk-Hansen | 74/142 |

FOREIGN PATENT DOCUMENTS

| | | | | |
|---|---|---|---|---|
| DE | 10031473 C1 | | 2/2002 | |
| EP | 1167754 A2 * | | 1/2002 | |
| EP | 1 775 490 A1 | | 4/2007 | |
| EP | 2 064 456 A1 | | 6/2009 | |
| JP | 2000-205287 A | | 7/2000 | |
| JP | 2007-505279 A | | 3/2007 | |
| WO | WO 2006/127878 A2 | | 11/2006 | |
| WO | WO 2007/136918 A2 | | 11/2007 | |
| WO | WO 2008/034412 A1 | | 3/2008 | |
| WO | WO 2009/002843 A1 | | 12/2008 | |
| WO | WO 2009/005009 A1 | | 1/2009 | |
| WO | WO 2009005009 A1 * | | 1/2009 | F16C 35/06 |

OTHER PUBLICATIONS

International Search Report and Written Opinion from International Application No. PCT/GB2010/001733, dated Jan. 21, 2011.
Great Britain Search Report from Great Britain Application No. 0916189.4, dated Jan. 13, 2010.
Office Action from corresponding Chinese Patent Application No. 201080051594.9 dated Dec. 1, 2014.
Office Action from corresponding Chinese Patent Application No. 201080051594.9 dated Mar. 31, 2014.
Office Action from corresponding European Patent Application No. 10766308.0 dated Dec. 11, 2015.
Office Action from corresponding Japanese Patent Application No. 2012-529336 dated Apr. 3, 2014.
Office Action for European Application No. EP 10 766 308.0 dated Oct. 18, 2016.

* cited by examiner

BEARING FOR WIND TURBINE

TECHNICAL FIELD

This invention relates to a bearing comprising a relatively fixed race for a rolling element, and particularly to a bearing comprising an inner race and a concentric outer race, preferably having a plurality of rolling elements therebetween. The rolling elements may comprise balls or rollers, and be arranged in one or more rows. The invention is also applicable to plain and tilting pad bearings. In this specification reference to 'race' includes appropriate reference to 'bush'.

BACKGROUND TO THE INVENTION

Typically such a bearing supports the rotating load of a moving element with respect to a ground element. One of the races, constitutes or is fixed to the moving element and the other is fixed to the ground element, typically by an interference press fit. The weight of the load is taken vertically on the upward facing side of the fixed race or bush, via the rolling elements where provided. Typically, a race which is fixed to the load rotates in use, so that the load is transmitted progressively and repeatedly around the entire circumference thereof. However the race or bush which is fixed to the ground element, being relatively stationary, has weight taken continuously by the same upwards facing portion; conversely the downwards facing portion takes no weight. As a result wear of the relatively fixed race is asymmetric, and the bearing may require replacement more frequently than if wear had been distributed around the entire circumference of the fixed race. Non-vertical loads may be transmitted to the same sector of a relatively stationary bearing, for example due to the separating forces on a pair of parallel geared shafts.

The problem of asymmetric wear is most apparent in bearings which support sustained unidirectional loads and/or support high bending forces in the vertical plane, such as hub bearings of wind turbines. The traditional solution is to employ larger bearings of high precision, but also to accept that more frequent replacement may be necessary. Large bearings are difficult and expensive to manufacture, and tend also to suffer disproportionate deterioration due to vibration compared with small bearings.

What is required is an arrangement capable of eliminating this kind of asymmetric wear profile, but which is adaptable to standard types of bearing, particularly rolling element bearings, and particularly to the fixed and moving elements which transmit loads via the bearing.

A further problem is sustained static pressurisation of bearing lubricant between the metal surfaces of the bearing. This occurs in the region of the upper side of the fixed race of the bearing arrangement when it is static. Over time, hydrogen atoms may escape from hydrocarbon molecules in the lubricant and react with the metal surfaces resulting in hydrogen embrittlement of the metal surfaces, which increases the incidence of failure.

What is required is an arrangement capable of limiting the exposure of the metal surfaces to prolonged contact with static pressurized lubricant.

One solution to these problems is to provide a bearing assembly comprising an inner race, and an outer race concentric with the inner race, one of said races being adapted to idle in rotation on a ground element.

This arrangement is applicable to a plain bearing, but is particularly suitable for a rolling element bearing having rolling elements between the inner and outer races.

The bearing is thus arranged so that the race of the ground element is adapted to idle on its support. The idling speed is preferable imperceptible, and may be as low as a few revolutions over the rotation and life of the bearing. Idling may be in the range 0.1 degree per day to 0.1 revolutions per minute.

Faster idling may be permissible according to the type and size of bearing, and kind of installation. In any event idling above 50 rpm, alternatively one tenth of hub speed, is not envisaged. Furthermore this solution is particularly suitable for large bearings, having a shaft diameter in excess of 250 mm.

In order to idle, the race of the ground element slides on or in the ground element, rather than being an interference fit, and the corresponding diameter of this race may be dimensioned accordingly. Thus where the inner race is mounted on the ground element, the inner diameter is slightly increased; where the outer race is on the ground element, the outer diameter is slightly reduced. Alternatively the ground element may be sized as a relatively loose fit in or on the adjacent race.

The race of the ground element should not rotate at a speed sufficient to cause wear of the ground element or of the race itself, and is preferably at least an order of magnitude less than the speed at which such wear is measurable over the life of the bearing.

The idling rotation may be continuous. However intermittent motion is also possible, and may be suitable where the bearing can tolerate a fixed position of one race for a pre-determined period—for example up to 5 years. Reversing and reciprocating motion is also envisaged.

It would be desirable to regulate and/or control idling in order to allow intelligent relative positioning of the races.

SUMMARY OF THE INVENTION

According to the invention there is provided a bearing assembly for a rotating element, said bearing assembly comprising a race adapted to be fixed relative to ground in normal use, wherein the assembly is further adapted to selectively free the fixed race for arcuate movement relative to ground. Preferably the assembly comprises an inner race, and an outer race concentric with the inner race, one of the races being adapted for fixing against rotation on a ground element, wherein said assembly is further adapted to selectively free the fixed race for arcuate movement on the ground element. Such movement is typically not along the rotational axis.

Such an arrangement permits the relatively fixed race to be parked on the ground element in normal use, but shifted arcuately on demand to expose a different sector to static loads. The arrangement also permits the fixed race to be shifted arcuately in response to loads in other directions, if it is determined that such loads may lead to deterioration of the bearing surface supporting said loads.

Preferably the bearing assembly comprises an integrated locking device movable axially with respect to the normally fixed race from a condition in which the normally fixed race is fixed against rotation on the ground element, to a condition in which the normally fixed race is free for arcuate movement with respect to the ground element. Said locking device preferably increases the radial dimension of the bearing annulus, that is to say a radial dimension from the inner surface of the inner race to the outer surface of the outer race. In a preferred embodiment the locking device comprises a wedge, preferably an annular wedge, which may have a wedge angle in the range 5°-89°.

The locking device may alternatively provide an axial clamping load sufficient to restrain the normally fixed race against rotational drag forces in use.

Preferably the locking device is located at one side of the races and within the annular envelope defined by maximum outer radius of the outer race and the minimum inner radius of the inner race.

In a preferred embodiment the locking device is movable in one direction by a thrust device, such as a hydraulic actuator, against the effect of a return spring. The return spring may act directly upon the normally fixed race. In the preferred embodiment said return spring biases the normally fixed race to the condition where it is fixed relative to the ground member. Movement of the locking device by a double acting thrust device is also possible, whereby the locking device is engaged and disengaged positively rather than being moved in one direction by a return force. A double acting hydraulic actuator may be used to move the locking device in such an arrangement.

The locking device preferably comprises sequential mechanisms adapted to firstly free the normally fixed race for arcuate movement relative to the ground element and to secondly move the normally fixed race arcuately relative to the ground element. Such relative movement is in a preferred embodiment uni-directional, and may be a push or a pull.

The locking device is preferably reversible whereby relative movement of the normally fixed race is ceased prior to parking the fixed race relative to the ground element.

Preferably the locking device includes a reversibly movable thrust member having a first movement range for freeing said normally fixed race and a second movement range for moving said normally fixed race. Said first movement range is preferably a linear progression. Said second movement range is preferably also a linear progression, and adapted to be repeated on demand whilst maintaining said thrust member at or beyond the limit of said first range of movement.

The thrust member may be an annulus centred on the rotational axis of the bearing assembly. Preferably the bearing assembly is a rolling element bearing, such as a cylindrical roller bearing or taper roller bearing.

The thrust member preferably comprises a single actuator for both first and second stages. The thrust member may include a step mechanism whereby repeated strokes of said actuator are cumulative and proportional to movement of said thrust member over the first movement range.

Preferably said normally fixed race includes a one-way clutch for connection to a ground element whereby unidirectional arcuate movement thereof is assured in response to movement of said thrust member in the second movement range.

Preferably the normally fixed race is the inner race, and the ground element is a hub fitted into the inner race. The locking device is preferably directly insertable between said inner race and hub in use.

In one embodiment, the normally fixed race includes a frusto-conical surface opposite the bearing track, and a circular wedge insertable axially of the fixed race between said frusto-conical surface and the ground element. Thus axial movement of the circular, annular wedge may lock and unlock the fixed race with respect to the ground element, on demand.

Preferably a radially directed abutment of the fixed race retains the circular wedge with respect thereto, but with clearance for movement of said wedge from a locked to an unlocked condition.

In a preferred embodiment the cone angle of the wedge is the same as the cone angle of the fixed race.

Preferably the circular wedge is biased into engagement with the normally fixed race by resilient means, such as cone spring or Belleville washer. Said spring may be housed in the clearance between the wedge and an abutment of the normally fixed race, so as to bias the normally fixed race to the parked condition The circular wedge may have splits, in the manner of a collet, so as to improve the clamping load thereof. An anti-seize coating may be employed on the cone surfaces, as may an anti-friction coating.

The assembly may further include an actuator for said wedge. In one embodiment said actuator comprises a hydraulic chamber adapted to exert an axial load on the wedge, on demand. The chamber may be circular about the rotational axis of the bearing, and include an annular piston acting on said spring in use. Alternatively the actuator may be mechanical, in the form of a cam. Preferably the actuator is an annular cam co-axial with the circular wedge and having one or more ramps adapted to urge the wedge axially upon rotation of the cam about said axis. Said annular cam is preferably indexed by a tangentially mounted thruster.

The thruster may be in the form of a hydraulic thruster having a fixed stroke and engageable with a tooth of said annular cam. Preferably a plurality of teeth are on the radially outer circumference of said cam, and said thruster is mounted relative to the ground element for engagement with said teeth.

In a preferred embodiment said annular cam includes a releasable anti-reversing latch whereby successive actuations of said hydraulic actuator engage successive teeth of said cam so as to progressively rotate said cam about said axis with respect to said actuator.

The teeth of the cam are preferably ratchet teeth, each tooth having a substantially radial advancing face for engagement by said actuator.

The anti-reversing latch is preferably a relatively fixed pawl pivotable into engagement with an advancing face on demand, but adapted to ratchet over said teeth. For example a second hydraulic thruster may be provided to urge said pawl into engagement via a resiliently compressible link.

In a preferred embodiment said cam further includes an abutment engageable with a nudge member mounted on said normally fixed race via a one-way clutch. Thus arcuate movement of said cam under the action of said hydraulic thruster causes nudging of said normally fixed race in an advance direction relative to said wedge. Accordingly the position of load on the fixed race is altered.

The fixed race, once nudged, may stay in the new position by virtue of frictional forces, but preferably a second one-way clutch is provided operationally between the fixed race and the wedge in order to prevent reverse movement. Successive nudges of the nudge member result in successive movements of the normally fixed race, and appropriate re-positioning thereof.

The nudge member is preferably in the form of a ring concentric with the axis of rotation of the bearing.

The one-way clutch or clutches may be in the form of a rotary sprag, wrap spring, or any other convenient form.

In a preferred embodiment the cam may include ratchet teeth over part of the circumference only, successive ratchetings across all teeth being sufficient to disengage said wedge and normally fixed race. Ratcheting beyond the final tooth is not possible since the anti-reversing pawl has no corresponding advancing face, and accordingly further successive strokes of said hydraulic thruster are adapted to reciprocate the cam, and provide said nudging action.

Many alternative means of driving a cam ring are possible, in order to move the normally fixed race to and from the parked condition. For example a hydraulic motor, typically in the form of a hydrodynamic turbine with multiple jets, may turn the cam ring via a suitable step down gear. One suitable gear form is a worm drive having a ratio of greater than 60:1 whereby reverse motion is inhibited.

Where regular arcuate movement of the normally fixed race is desired, a clock-type escapement may be used to meter rotation, for example through a fixed angle; each oscillatory stroke of the escapement thus regulates precisely the corresponding movement of the normally fixed race. The escapement may be of any suitable kind, and is not limited to mechanical arrangements. A typical mechanical escapement could comprise a pawl engageable with successive teeth of a toothed ring of the kind described above in relation to the fixed stroke thruster.

BRIEF DESCRIPTION OF DRAWINGS

Other features of the invention will be apparent from the following description of several preferred embodiments shown by way of example only in the accompanying drawings in which.

DESCRIPTION OF PREFERRED EMBODIMENTS

Figure 1:
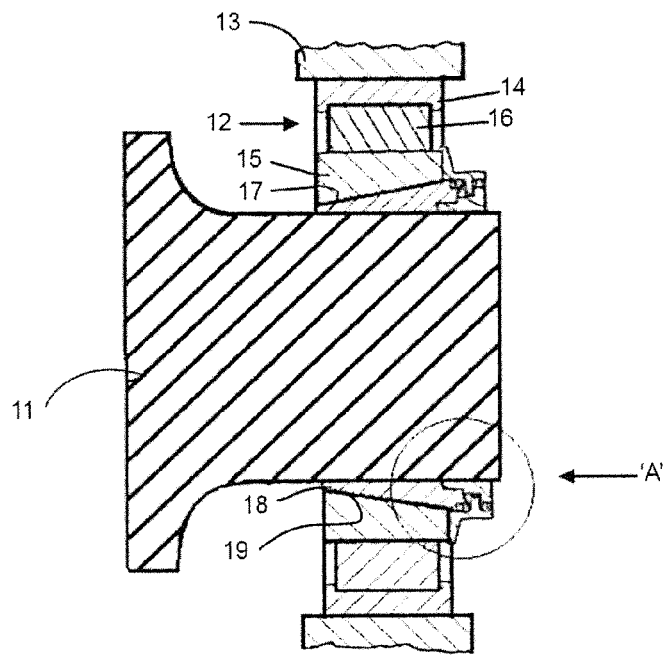
FIG. 1 is a schematic axial section through a first embodiment of the invention.
Figure 2:
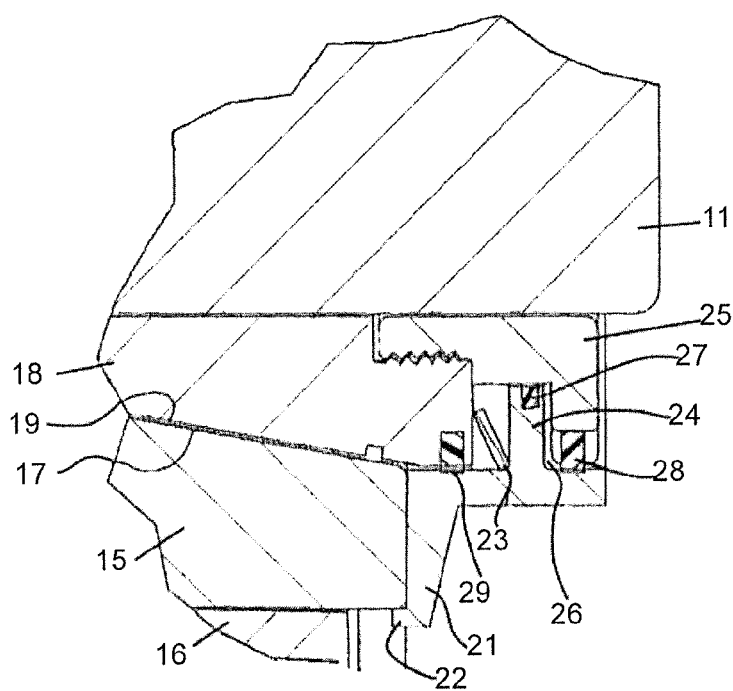
FIG. 2 is an enlarged view of the circled part of FIG. 1.

With reference to FIGS. 1 and 2 a stationary circular hub 11 has thereon a rolling element bearing 12 to support a rotating member 13, which may for example be a rotor of a wind turbine.

The rolling element bearing comprises an outer race 14 pressed into the rotating member 13, an inner race 15, and a circular array of rollers 16 between the races.

In order to allow easy fitting and removal of the bearing 12 to the hub 11, the inner race has a frusto-conical radially inner surface 17 adapted to receive a corresponding annular fitting member 18 with a frusto-conical radially outer surface 19. This arrangement permits the rolling element bearing to be placed over the hub, and locked in place by pressing in the fitting member 18 in the direction of arrow 'A'. By suitable selection of the taper angle, in a well-known manner, the fitting member will fix the bearing in place relative to the hub, yet be removable on application of a release load opposite to the direction of arrow 'A'. The fitting member may be self locking, or may be retained by any suitable means, such as a circlip.

Thus it will be understood that in the locked condition of the fitting member 18, the inner race 15 may be subjected over time to potentially damaging forces on the load bearing upper face, whereas in the unlocked condition of the fitting member, the inner race is free to be moved arcuately so as to change the load bearing portion thereof.

Only slight relative movement between the inner race and the fitting member is required to achieve freedom of movement of the inner race, and it is possible for either the fitting element or the inner race to be fixed axially relative to the hub.

As shown in greater detail in FIG. 2, a circular outer housing 21 is fixed relative to the inner race 15. The outer housing may be split on a diameter and for example mounted to a suitable surface of the inner race by a circular shoulder 22 and circumferential clamp (not shown).

A Belleville spring washer 23 acts between radially inwardly directed abutment 24 of the outer housing 21, so as to bias the fitting member to a condition in which the inner race 15 is fixed or parked relative to the hub 11.

A circular inner housing 25 may be press-fitted to the fitting member 18 and has radially outwardly extending portions which co-operate with corresponding portions of the outer housing 21 to define a hydraulic piston chamber 26. Suitable annular sliding seals 27, 28 close the chamber 26. The housing may alternatively be screw-threaded to the fitting member, as illustrated.

In use hydraulic oil under pressure can be admitted into the chamber 26 to cause the inner housing 25 to be urged to the right (as viewed) relative to the outer housing 21. As a result the fitting member 18 moves to the unlocked condition whereby the inner race 15 is able to move circumferentially.

In order to promote movement of the fitting member 18, and to facilitate arcuate movement of the inner race 15, hydraulic oil under pressure may also be admitted to the space between surfaces 17 and 19 to form a hydrostatic bearing. Suitable sliding seals may be provided to confine this oil, of which one is shown at 29.

The hydraulic oil is preferably the same as that used for lubrication of the rolling element bearing.

Figure 3:
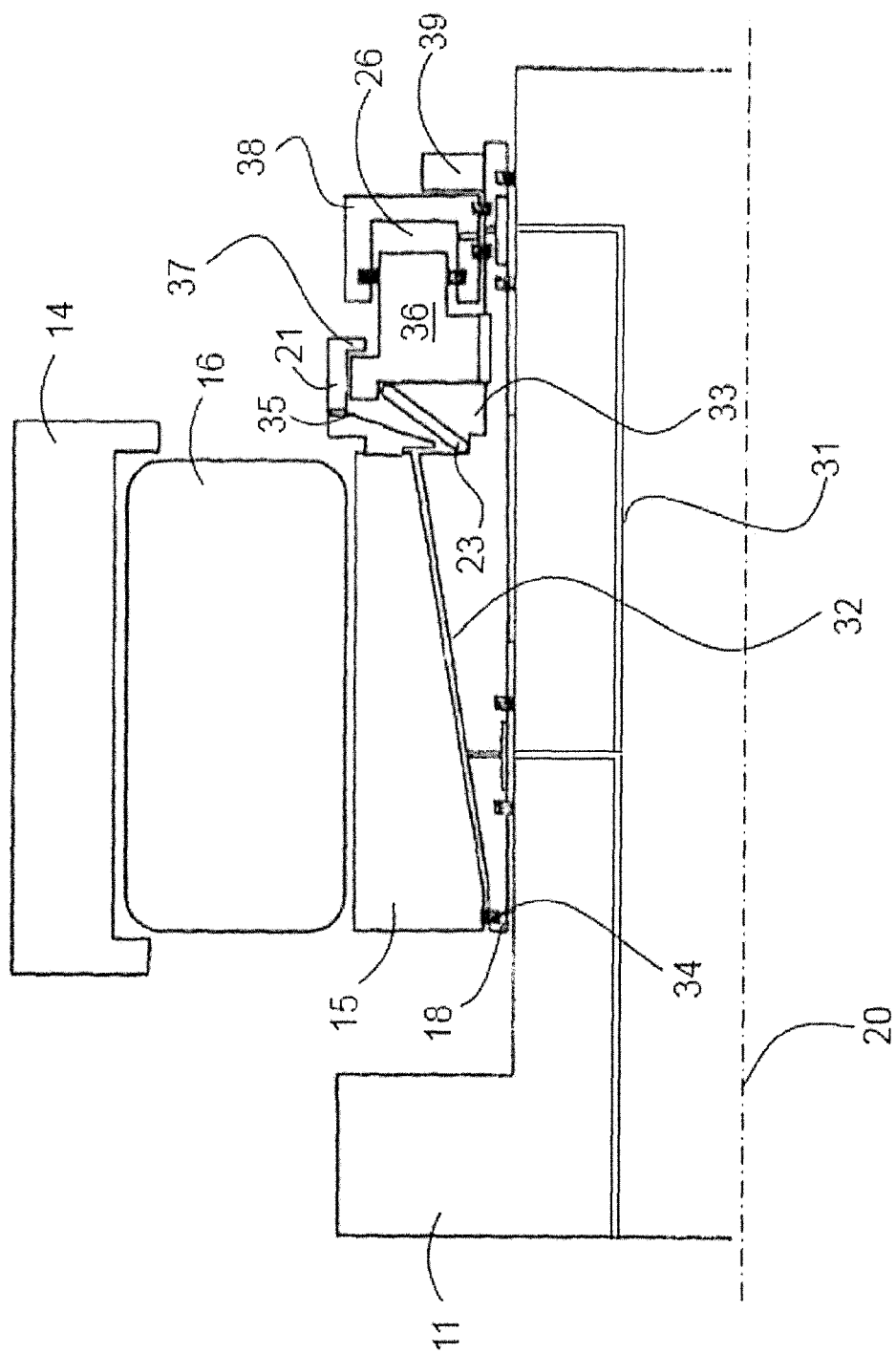
FIG. 3 is a schematic axial section through a second embodiment of the invention.

A second embodiment is illustrated in FIG. 3, in which parts common to the first embodiment carry the same reference numerals.

A hydraulic oil feed 31 has passages through shaft 11 to feed both the frusto-conical space 32 between the inner race 15 and the fitting member 18, and the piston chamber 26. The space 32 is open to the chamber 33 housing the Belleville spring 23, but is closed at the opposite end by seal 34. The spring chamber 33 has a vent 35.

An annular piston 36 is keyed to the fitting member 18 against relative rotation, but can slide axially of the shaft. In the unenergized condition, the piston chamber 26 is unpressurized and the Belleville spring 23 urges the fitting member to the left (as viewed) into locking engagement. The piston 36 is urged to the right by the spring 23 until abutting against an inturned lip 37 of the outer housing 21. This lip 37 also prevents the inner race 15 from sliding off the fitting member to the left as viewed.

Clearances are somewhat exaggerated in FIG. 3 to demonstrate the principle of operation, but in the engaged condition the inner race 15 is parked against arcuate movement with respect to the shaft 11, the centreline 20 of which is also illustrated.

Upon pressurization of the oil feed 31, the piston 36 moves to the left away from abutment with the lip 37 (as illustrated) and the fitting member 18 is free to float relatively to the right so as to unlock the inner race 15.

In FIG. 3, the piston chamber is defined by an annular housing 38 which is held in place by a locking ring 39, but is free to float on an annular extension 40 of the fitting member when unpressurized. Numerous hydraulic seals confine the hydraulic fluid, as will be readily understood. The vent 35 permits fluid pressure to drain from the assembly, and is of a size selected to maintain sufficient operational pressure in the chamber 26 when required.

Alternatively a suitable restrictor may be placed in the fluid supply line to the space 32.

Figure 4:
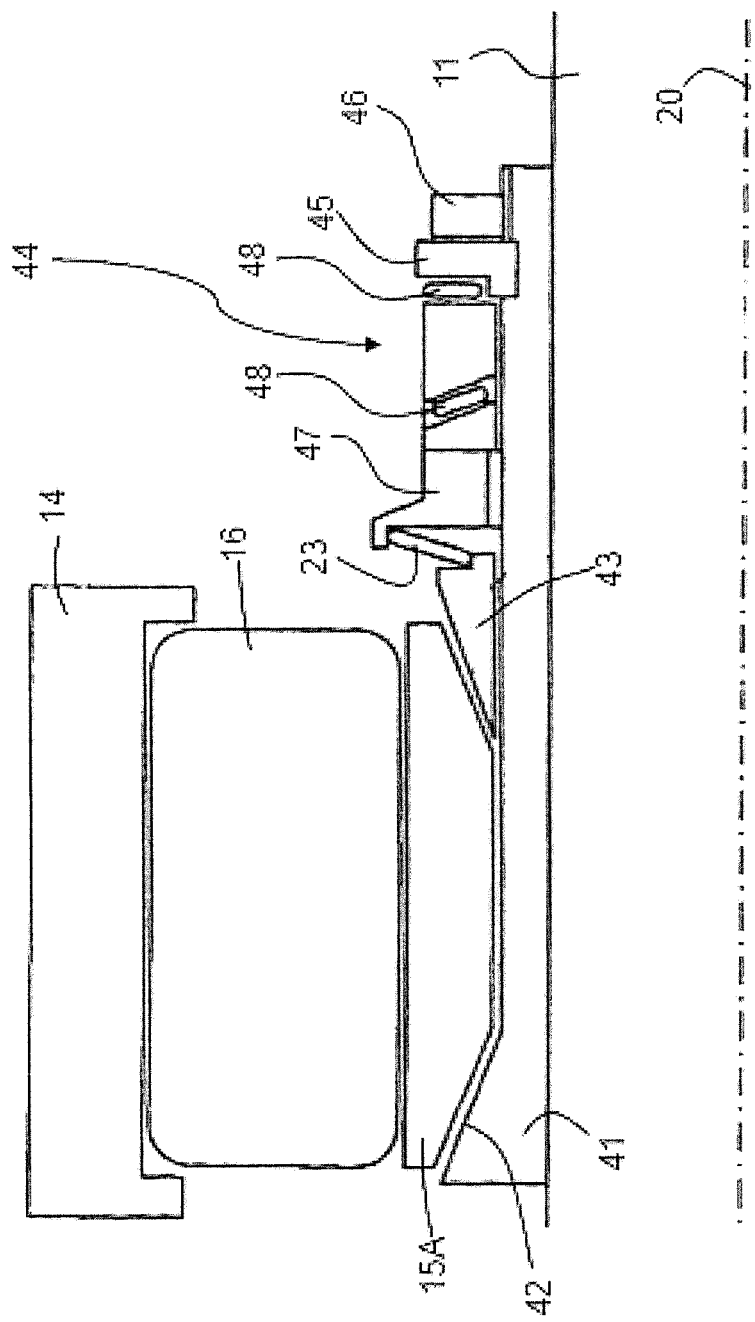
FIG. 4 is a schematic axial section through a third embodiment of the invention.
Figure 5:
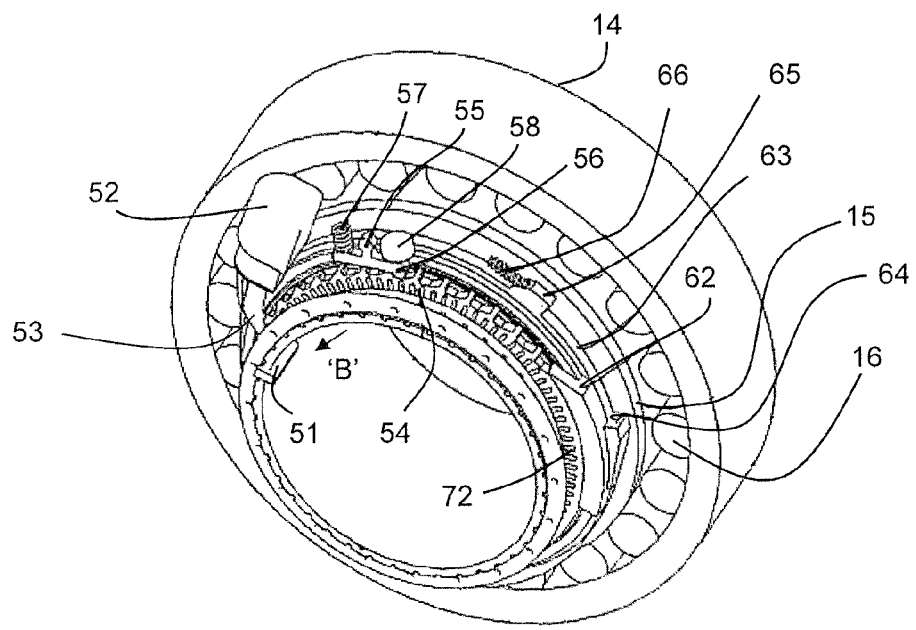
FIG. 5 is a perspective view of a bearing assembly according to a fourth embodiment of the invention.
Figure 6:
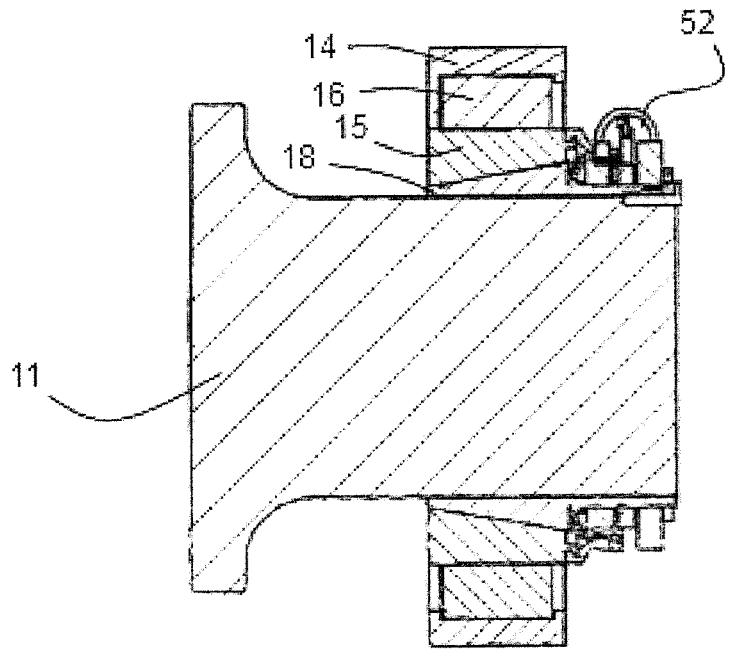
FIG. 6 is a schematic axial section through the embodiment of FIG. 5.

A third embodiment is illustrated in FIG. 4 and comprises a two-part fitting member comprising a sleeve 41 fixed to the shaft 11 and having an annular frusto-conical ramp face 42 at one end, and an axially movable annular frusto-conical wedge 43 at the other end.

The ramp face 42 and wedge 43 confine an inner race 15A which has matching frusto-conical faces on the radially inner side, and can move relatively axially together to lock the inner race 15A to the sleeve 41, thereby to prevent relative rotation of the inner race relative to the shaft 11.

In the embodiment of FIG. 4, an arcuate cam 44 is located about the sleeve 41 and is movable circumferentially to load or unload the wedge 43, as will be further explained. An abutment 45 is provided for the cam 44, and is retained by a nut 46 or the like. A retainer 47 for the Belleville spring 23 is keyed to the sleeve 41, and suitable rollers 48 are provided between the relatively movable elements, as illustrated. Three or more equispaced cams may be provided to evenly distribute the axial load on the wedge.

The embodiment of FIG. 4 has the advantage that the inner race is located axially of the shaft 11, and is not subject to axial loads from the fitting member. In FIG. 4 such axial loads are resisted by the ramp face 32, and thus not transmitted to the outer race 14 as in the embodiment of FIG. 3. Furthermore, the inner race is maintained centrally when unparked.

FIGS. 5-8 illustrate a fourth embodiment incorporating a mechanical release for the fitting member. As with other embodiments common reference numerals are used for parts having the same function. This embodiment provides a self-contained bearing assembly adapted for fitting to a suitable hub, and in which the actuation mechanism is at one side and within the annulus defined by the hub 11 and the external diameter of the outer race 14.

The fitting member 18 is coupled against rotation with respect to the hub 11 by a key 51.

A first hydraulic actuator 52 is connected to a pawl 53 which engages external teeth of a cam ring 54. One stroke of the first actuator indexes the cam ring by one tooth in the direction of arrow 13. The actuator is responsive to pressurization from a suitable hydraulic source and control system. Removal of pressure causes the pawl to be withdrawn by a light spring. A leaf spring biases the pawl into engagement with the cam ring as it advances from the retracted condition.

An anti-reversing lever 55 is pivoted against the centre and has a tooth 56 at one end which is engageable with the teeth of the cam ring 54. A light coil spring 57 pivots the tooth 56 out of engagement, and is opposed by a second hydraulic actuator 58 which can be pressurized to apply a load via a spring (see FIG. 7), so as to place the tooth 56 into engagement with the cam ring. The teeth of the cam ring 54 are ratchet teeth, and pass over tooth 56 in the direction of arrow B when the tooth is biased inwards by the second actuator 58.

In use, pressurization of first actuator 52 and second actuator 58 causes the cam ring to be advanced in the direction of arrow B, and to be retained in the advanced condition by the tooth 56 ratcheting over an adjacent tooth of the cam ring.

Upon release of pressure in the first actuator 52, the cam ring 54 remains in the advanced condition. A further pressurization of the first actuator causes the cam ring to advance another step, and so on. Pressurization may be by way of a square wave electrical signal.

Thus so long as the second actuator 58 remains pressurized, the cam ring 54 can be advanced by successive pressure pulses to the first actuator 52.

Figure 7:
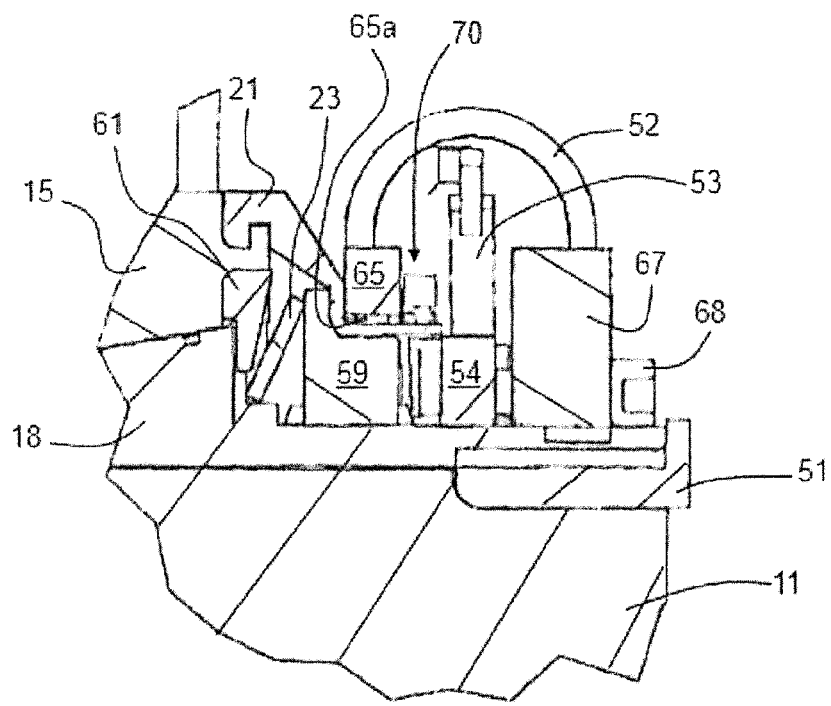
FIG. 7 is an enlarged view of the indexing mechanism of FIG. 6.

As best seen in FIG. 7, a Belleville spring 23 acts between the fitting member 18 and a backing ring 59, which itself abuts a lip 37 of an outer housing 21 of the inner race 15. Thus as illustrated in FIG. 7, the spring 23 forces the fitting member into engagement with the inner race, which is consequently locked against rotation relative to the shaft 11.

The cam ring 54 includes one or more cam surfaces adapted to urge the backing ring 59 to the left as viewed. Upon being urged to the left, the backing ring lifts off the lip 37, and the fitting member 18 is free to float to the right, thereby unlocking the inner race 15, and permitting arcuate movement relative to the hub. Consequently it will be understood that successive pressure pulses to the first actuator 52 can rotate the cam ring 54 through angle 'C' (FIG. 8) which is sufficient to release the fitting member and hence the inner race.

FIG. 7 also illustrates an annular travel stop 61 to prevent excessive movement of the fitting member with respect to the inner race. Oil from the hydrostatic bearing formed between the fitting member and inner race is held back by this travel stop when the inner race is released.

The fourth embodiment also provides a means of moving the inner race arcuately, when unlocked.

Figure 8:
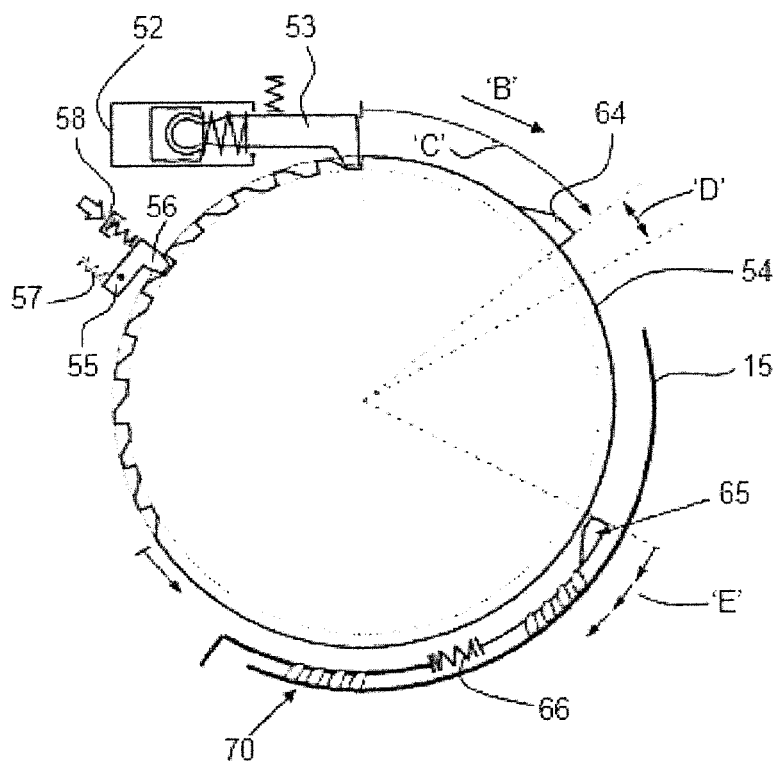
FIG. 8 is a schematic illustration of the operation of the fourth embodiment.

The number of teeth on the cam ring 54 is limited, and the last tooth is followed by a relatively long ramp face 62 beyond which no recess for the tooth 56 is provided. Consequently when the first actuator has made sufficient strokes for the cam ring 54 to present the last ratchet tooth to the lever 55, further strokes merely allow the cam ring to oscillate back and forth through angle 'D' (FIG. 8).

However, an adjacent annulus 63 of the cam ring has a radial abutment 64 which is arranged to come into contact with a radial abutment of a nudge ring 65, so that oscillation of the cam ring 54 causes oscillation of the nudge ring 65 against the effect of a light return spring 66.

The nudge ring 65 is mounted via a conventional one-way clutch, or sprag 65a to an annulus of the inner race 15, such that oscillation of the nudge ring results in repeated one-way indexing of the inner race. In this way the inner race may be repositioned relative to the hub, so as to place a different sector in the position where vertical loads are reacted; successive nudges are indicated at 'E' (FIG. 8).

The inner race 14 is mounted via a second one-way clutch 70 grounded on the hub, so as not to reverse back to the position prior to nudging.

A collar 67 and nut 68 retain the components to the fitting member 18. The collar 67 is keyed to the fitting member as illustrated.

Figure 9:
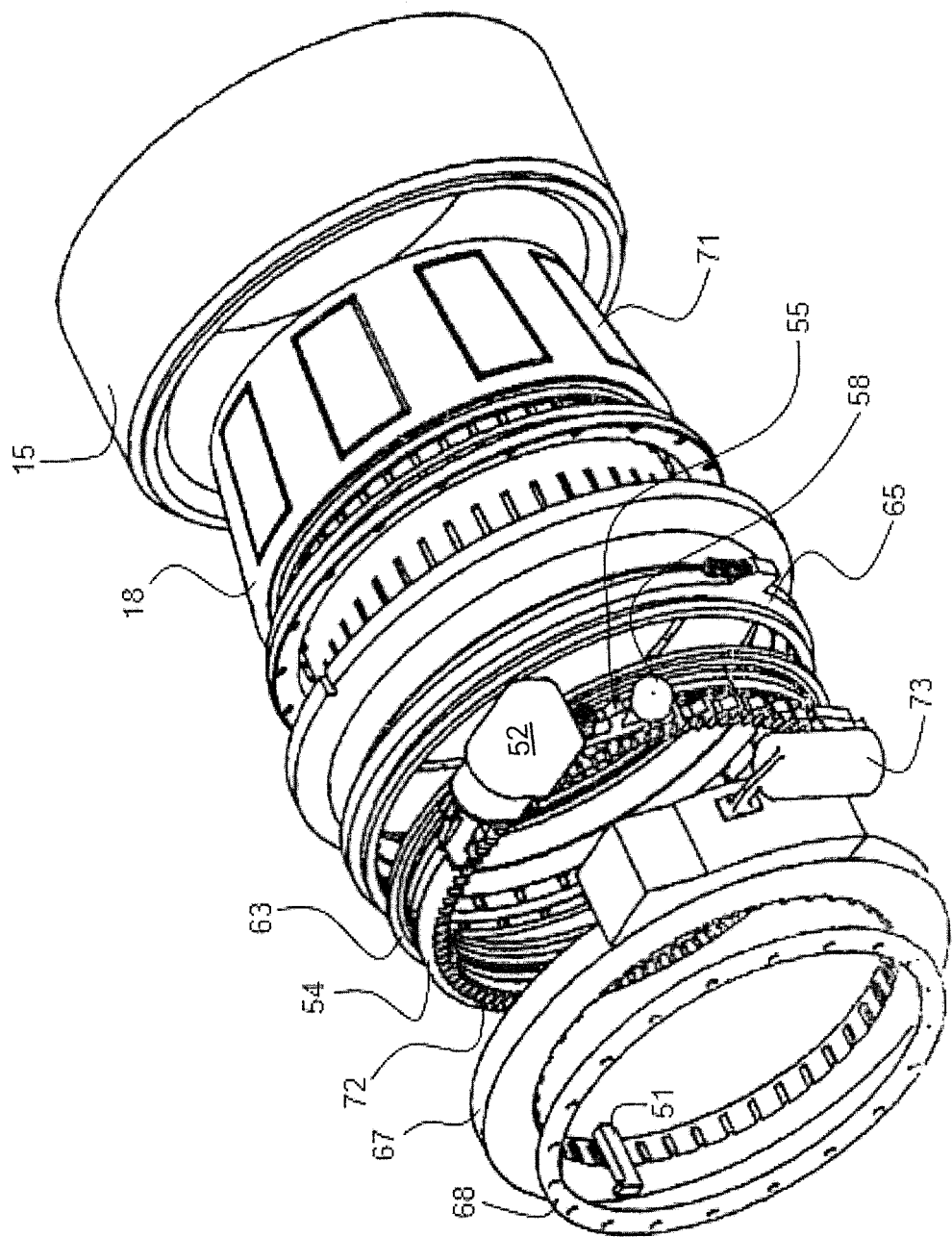
FIG. 9 is an exploded view of the components of the fourth embodiment.

FIG. 9 is an exploded view of the components of the assembly of FIGS. 5-8.

The fitting member 18 includes rectangular recesses 71 on the frusto-conical surface thereof, which comprise hydrostatic bearing pads adapted to assist in disengaging the fitting member from the inner race.

These pads are supplied with hydraulic oil under pressure, as described in relation to the first embodiment.

Figure 10:
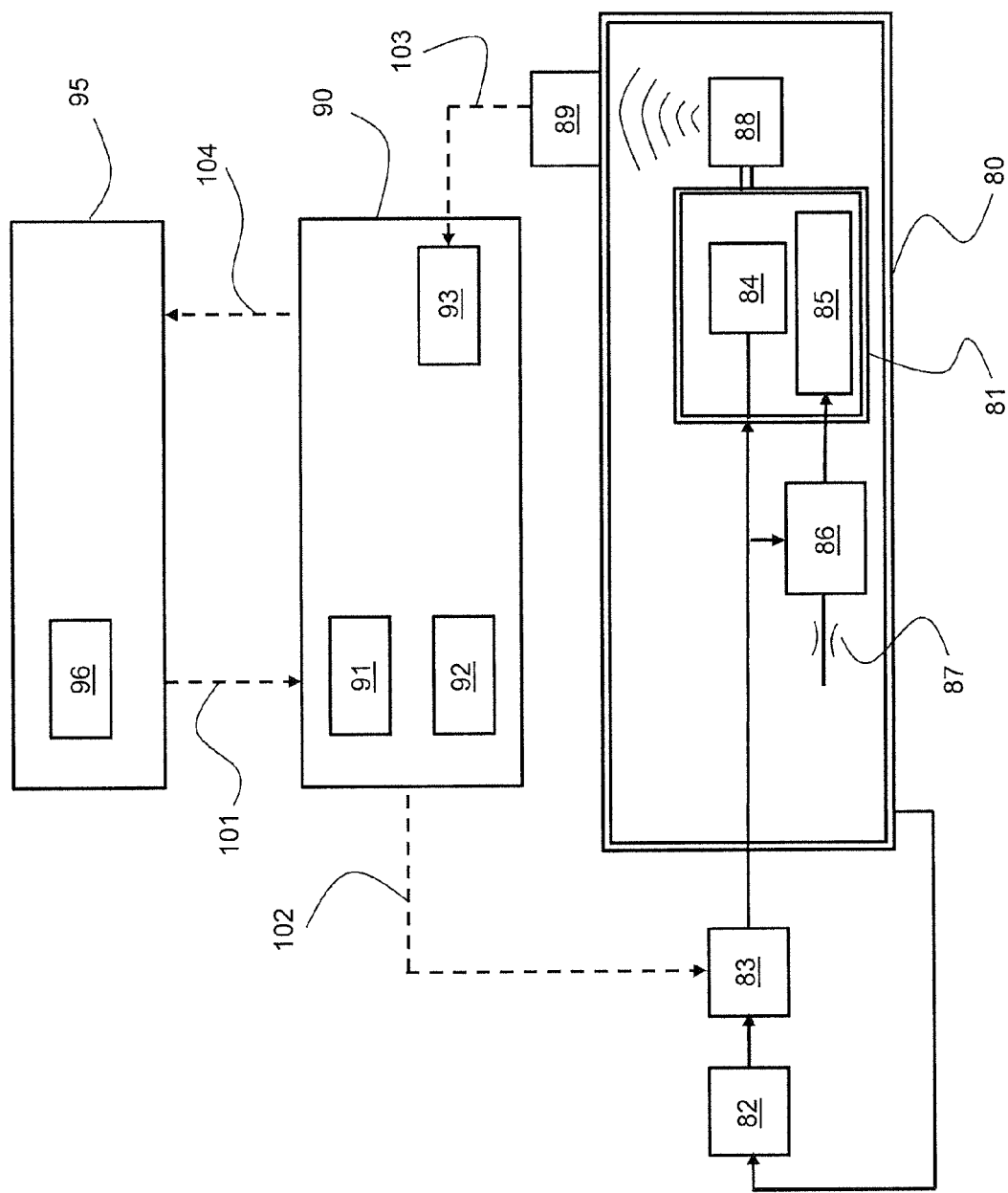
FIG. 10 is a schematic arrangement of a control system suitable for the invention.

In order to permit detection of the number of strokes of the first actuator, and hence the position of the cam ring 54 and inner race 15, a series of axially extending projections 72 of the cam ring may be adapted to ring a 'bell' 73 by simple contact therewith. For example such projections may have the same pitch as the ratchet teeth. The 'ring' may be different according to the position of the cam ring, for example by using a projection of different profile. 'Ringing' of the bell may be detected by suitable accelerometers or the like and provide an input to a control system which is now described with reference to FIG. 10.

A gearbox 80 for the driveline or gearbox of a wind turbine contains a rotor bearing 81 of the kind described by reference to FIGS. 1-9. Hydraulic oil within the gearbox is circulated to an actuator for a fitting member of the bearing via a pump 82 and valve 83.

The bearing 81 incorporates a turn function 84 for the inner race, and a release/hold function 85. The hydraulic signal to the release/hold function is via an accumulator 86 having a restricted vent 87.

In use the valve 83 is opened repeatedly to feed the functions 84 and 85. The fitting member is released, and the inner race turned in the manner described with reference to FIGS. 5-7. The accumulator 86 ensures that pressure is maintained in the second actuator so as to avoid reversing of the cam ring 54.

Upon final closure of the valve 83, for example when the inner race is in a new position, the hydraulic pressure drains via vent 87 so that the cam ring returns to the start condition whereby the fitting member is re-engaged.

It will be understood that in the event of a failure of the pump 82 or loss of hydraulic pressure due to a leak or the like, the fitting member will mechanically re-engage under the action of the Belleville spring.

A percussive signal generator 88, such as a bell, emits a characteristic representative of a specific angular rotation of the cam ring, and this signal is detected by a suitable sensor 89.

A bearing control unit 90 includes modules for actuation strategy 91, bearing condition calculation 92, and bearing position calculation 93.

A wind turbine control unit 95 may include a module for bearing condition calculation 96 in place of module 92.

In use the wind turbine control unit 95 receives typical inputs of for example speed, torque, temperature, state of emergency brake, percentage power de-rating and the like in order to predict the condition of the hub bearing. Thus an algorithm may indicate at what stage rotation of the relatively fixed race is desirable, said algorithm being based upon accumulated knowledge from several bearing installations.

Upon determining that movement of the fixed race is desired, the control unit 95 will output to the bearing control unit 90 a signal 101 giving, for example, an instruction to move the fixed bearing by a predetermined arcuate amount, say 20°.

The bearing control unit will send successive signals 102 to open the valve 83 in order to release the fixed bearing race, and turn it though the desired angle. Feedback is provided by the vibration sensor signal 103.

The actuation strategy module 91 controls the valve 83 in a desired manner, and the bearing condition calculation module 92 (or 96) calculates and records the condition of the fixed bearing race.

A typical strategy for determining position of a fixed bearing race may, for example, to use a look-up table in conjunction with real-time operational information to rotate the race by 20° every 5000 hours. A prime number rotation sequence will avoid the risk of parking the race in the same position with the consequent risk of further localized deterioration.

A strategy may optimize bearing position over a fixed life, say 20 years, so as to distribute potential deterioration around the circumference of the fixed race.

Furthermore a strategy may use a determination of a damaged race sector to avoid further parking in the vicinity of that sector. Such a strategy is useful where non-standard damage is experienced, for example due to a manufacturing defect.

In the described embodiments, the hub and inner race are assumed to be stationary in normal operation. However it will be understood that outer race and housing thereof could be stationary, and the inner race turn with for example a rotor connector thereto. In such circumstances, idling of the outer race is required in order to avoid deterioration of the sector bearing the vertical load.

The invention requires certain components to be attached together, and which may be of dissimilar materials, such as the inner bearing race 15 and housing 21. Any suitable attachment method may be used, for example heat or friction welding, threaded engagement or dog engagement.

The invention claimed is:

1. A bearing assembly for a rotating element and comprising a race adapted to be fixed relative to a ground element without restricting independent rotation of the rotating element relative to the ground element, wherein the assembly includes a locking device adapted to engage said race on demand to fix said race relative to the ground element, the locking device being disengageable from said race to selectively free said race for arcuate movement relative to the ground element, and the bearing assembly further including an apparatus configured to arcuately advance said race to a new orientation relative to the ground element on demand, wherein the apparatus can arcuately advance said race without axially moving the race, wherein the locking device is an axially movable wedge, and wherein the apparatus comprises a thruster.

2. A bearing assembly according to claim 1, wherein the bearing assembly has two races, the two races being arranged as an inner race, and an outer race concentric with the inner race, one of the inner and outer races being adapted for fixing against rotation on the ground element.

3. A bearing assembly according to claim 2, wherein said locking device is adapted to engage a peripheral surface of one of the inner and outer races.

4. A bearing assembly according to claim 3, wherein said locking device is adapted to engage a circumferential peripheral surface of one of the inner and outer races.

5. A bearing assembly according to claim 1, wherein said thruster is a thruster for said locking device.

6. An assembly according to claim 5, wherein said thruster comprises a cam ring rotatable about the rotational axis of said bearing assembly.

7. A bearing assembly according to claim 1, wherein the bearing assembly is confined within an envelope defined by the outer diameter of said outer race and the inner diameter of said inner race.

8. A bearing assembly for a rotating element and comprising two races, one of the races being an inner race, and the other race being an outer race concentric with the inner race, one of the inner and outer races being adapted for fixing against rotation on the ground element without restricting independent rotation of the rotating element relative to the ground element, the bearing assembly further including a locking device adapted to engage one of said races on demand, and further including an apparatus configured to arcuately advance one of said races to a new orientation relative to the ground element on demand, wherein the apparatus can arcuately advance said race without axially moving the race, wherein the locking device is an axially movable wedge, and wherein the apparatus comprises a thruster.

9. A bearing assembly according to claim 8, wherein said locking device is adapted to engage a peripheral surface of one of the inner and outer races.

10. A bearing assembly according to claim 9, wherein said locking device is adapted to engage a circumferential peripheral surface of one of the inner and outer races.

11. A bearing assembly according to claim 8, wherein said thruster is a thruster for said locking device.

12. An assembly according to claim 11, wherein said thruster comprises a cam ring rotatable about the rotational axis of said bearing assembly.

13. A bearing assembly according to claim 8, wherein the bearing assembly is confined within an envelope defined by the outer diameter of said outer race and the inner diameter of said inner race.

14. A bearing assembly for a rotating element and comprising a race adapted to be fixed relative to a ground element without restricting independent rotation of the rotating element relative to the ground element, wherein the assembly includes a locking device adapted to engage said race to fix said race relative to the ground element, wherein the locking device comprises sequential mechanisms comprising an axially movable wedge and a thruster and is adapted such that, in a first stage, the wedge is arranged to disengage from said race to selectively free said race for arcuate movement relative to the ground element and, in a second stage, the thruster is arranged to move said race arcuately relative to the ground element, to expose a different sector of the race to static loads.

* * * * *